J. D. & A. M. HALSTED.
Hand-Plow.
No. 35,313.
Patented May 20, 1862.
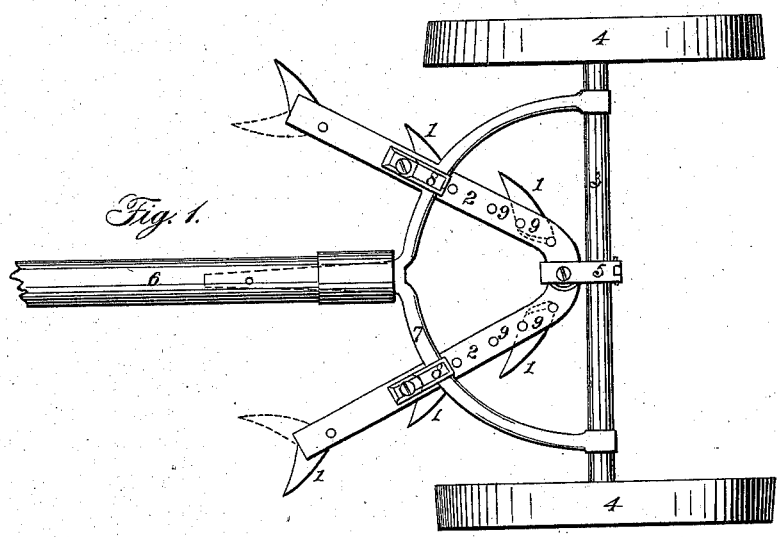
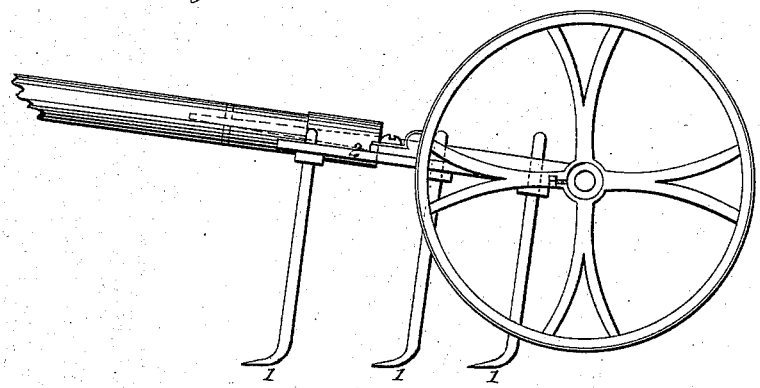
Witnesses:
L. A. Roberts
H. James Weston
Inventor:
Jas. D. Halsted
A. M. Halsted

UNITED STATES PATENT OFFICE.

JAMES D. HALSTED AND AUGUSTUS M. HALSTED, OF RYE, NEW YORK.

IMPROVEMENT IN HAND-CULTIVATORS.

Specification forming part of Letters Patent No. 35,313, dated May 20, 1862.

*To all whom it may concern:*

Be it known that we, JAMES D. HALSTED and AUGUSTUS M. HALSTED, of Rye, in the county of Westchester and State of New York, have invented a new and Improved Hand-Cultivator, the construction and operation of which we have described in the following specification and illustrated in its accompanying drawings with sufficient clearness to enable competent and skillful workmen in the arts to which it pertains or is most nearly allied to make and use our invention.

Our invention consists in the combination of a set of knives of a peculiar form, as hereinafter described, with a pair of arms which are hung on the axle of the machine so as to vibrate at the rear ends, and with a handle and pair of wheels arranged and operated as described, or in any other manner substantially the same.

The object of our invention is to provide a machine for market-gardeners which can be worked by hand, and which will cut the weeds from rows of small plants without disturbing the soil around their roots, so as to injure the plants themselves, which our machine accomplishes by cutting the weeds just below the surface, and by a peculiar form of the knives or blades the weeds are raised up sufficiently to allow the air to enter, but the ground is not disturbed enough to cover up or in any way injure the small plants. Our machine may be used as a cultivator by changing the position of the knives, as we have hereinafter more fully set forth.

In the drawings, Figure 1 is a plan of the cultivator. Fig. 2 is a side elevation of the same.

The different parts of the machine are represented as follows: 1 1 are the knives or blades. 2 2 are the arms to which they are attached. 3 is the axle of the machine, to which the wheels 4 4 are fastened, and with which they revolve. 5 is a clip or clasp, which secures the forward ends of the arms 2 2 in their position, and through which the shaft or axle 3 works. 6 is a handle, by which the machine is pushed or driven ahead. 7 is the fork end of the handle 6, by which it is attached to the axle 3. The axle passes through the ends of this fork and revolves in them. 8 8 are clamps, which hold the arms in position when they are adjusted to the different widths of the row. 9 9 are extra holes for the forward knives. They are used when it is desired to make the distance between the forward knives greater or less to suit the different kinds of plants. 10 is a ferrule or iron socket, which is put on the handle to prevent its splitting.

In using our machine the arms to which the knives are attached are first set in such a position that their rear ends shall be far enough apart to clear the rows of plants on each side. The forward knives are then put into one of the three sets of holes in the forward ends of the arms, according to the size of the plants which are to be cultivated. When the machine is thus set or arranged it is pushed through between the rows of plants, and the knives, passing just under the surface of the ground, and cuts the weeds a very small distance below the surface; and instead of covering them up, as other cultivators do, it merely raises them far enough to insure their wilting in the sun. The ground, however, is not so much thrown up as to cover the young plants, the knives accomplishing this by being made in such a manner as to cut obliquely across the ground, instead of straight through it. The knife, from the place where the blade begins, slopes to the rear, and from the point at which it begins to bend to a horizontal direction it slopes outward and backward, thus making a drawing or oblique cut across the soil.

By making the wheels stationary the machine will not, when it strikes a stone or other obstruction, be so liable to be thrown from its course, and thus cut and destroy the young plants in the row, or cut such plants as onions, turnips, &c.

For cultivating strawberries, &c., the two rear pairs of knives are changed over to the opposite side of the machine, and the points turned in, and the machine is made to pass between the rows, instead of over them.

Having thus fully described our invention, we claim—

The combination of the sets of knives 1 1, hereinbefore described, with the arms 2 2, to which they are attached, and with the clip 5, shaft or axle 3, wheels 4, handle 7, and clamps 8 8, the whole being constructed and arranged substantially as hereinbefore described, and operated as set forth.

JAS. D. HALSTED.
A. M. HALSTED.

Witnesses:
L. A. ROBERTS,
H. JAMES WESTON.